(12) United States Patent
DeHaan et al.

(10) Patent No.: US 8,713,177 B2
(45) Date of Patent: Apr. 29, 2014

(54) REMOTE MANAGEMENT OF NETWORKED SYSTEMS USING SECURE MODULAR PLATFORM

(75) Inventors: Michael DeHaan, Morrisville, NC (US); Adrian Likins, Raleigh, NC (US); Seth Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 829 days.

(21) Appl. No.: 12/130,424

(22) Filed: May 30, 2008

(65) Prior Publication Data

US 2009/0300180 A1 Dec. 3, 2009

(51) Int. Cl.
  *G06F 15/173* (2006.01)
  *G06F 15/16* (2006.01)

(52) U.S. Cl.
  USPC ............................ 709/225; 709/203; 709/224

(58) Field of Classification Search
  USPC ............. 709/220–226, 249; 726/14; 717/171, 717/172; 719/328, 329
  See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,243,747 B1 | 6/2001 | Lewis et al. | |
| 6,272,536 B1 | 8/2001 | van Hoff et al. | |
| 6,282,652 B1 * | 8/2001 | Scheifler | 726/14 |
| 6,381,742 B2 | 4/2002 | Forbes et al. | |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeidinger | |
| 6,594,664 B1 | 7/2003 | Estrada et al. | |
| 6,611,869 B1 * | 8/2003 | Eschelbeck et al. | 709/228 |
| 6,625,742 B1 | 9/2003 | Owhadi et al. | |
| 6,678,888 B1 | 1/2004 | Sakanishi | |
| 6,691,225 B1 | 2/2004 | Suffin | |
| 6,751,659 B1 | 6/2004 | Fenger et al. | |
| 6,757,837 B1 | 6/2004 | Platt et al. | |
| 6,769,022 B1 | 7/2004 | DeKoning et al. | |

(Continued)

OTHER PUBLICATIONS

USPTO Office Action for U.S. Appl. No. 12/395,536, mailed Nov. 8, 2011.

(Continued)

*Primary Examiner* — Melvin H Pollack
(74) *Attorney, Agent, or Firm* — Lowenstein Sandler LLP (57) ABSTRACT

Embodiments relate to systems and methods for the remote configuration of networked systems using a secure modular platform. A network management engine communicates with a set of remote machines, such as a collection of clients or servers on a network. The network management engine can present a systems administrator with a set of compact network commands to permit the administrator to interrogate, configure, and manage the set of controlled machines on a dynamic basis. The network management engine can, for instance, install or update software, detect viruses on the controlled machines, perform an inventory of installed hardware on the controlled machines, and perform other network management functions using pre-configured functions and APIs built into a network library or command directory. Besides incorporating pre-configured management modules, the network management engine further allows a systems administrator to add custom modules in the command directory, using efficient modular interfaces compatible with network-level management processing.

21 Claims, 4 Drawing Sheets

(56) References Cited

U.S. PATENT DOCUMENTS

| | | | |
|---|---|---|---|
| 6,779,004 B1 | 8/2004 | Zintel | |
| 6,845,464 B2 | 1/2005 | Gold | |
| 6,865,737 B1 | 3/2005 | Lucas et al. | |
| 6,947,939 B2 | 9/2005 | Fujibayashi et al. | |
| 6,966,058 B2 | 11/2005 | Earl et al. | |
| 6,986,033 B2 | 1/2006 | Miyamoto et al. | |
| 7,003,560 B1* | 2/2006 | Mullen et al. | 709/223 |
| 7,013,461 B2 | 3/2006 | Hellerstein et al. | |
| 7,036,010 B2* | 4/2006 | Wray | 713/151 |
| 7,051,101 B1 | 5/2006 | Dubrovsky et al. | |
| 7,058,797 B2 | 6/2006 | Miyamoto et al. | |
| 7,082,464 B2* | 7/2006 | Hasan et al. | 709/223 |
| 7,107,330 B1 | 9/2006 | Hamilton et al. | |
| 7,127,742 B2* | 10/2006 | Kramer et al. | 726/15 |
| 7,133,822 B1 | 11/2006 | Jacobson | |
| 7,165,109 B2 | 1/2007 | Chiloyan et al. | |
| 7,185,071 B2 | 2/2007 | Berg et al. | |
| 7,200,662 B2* | 4/2007 | Hasan et al. | 709/226 |
| 7,200,845 B2 | 4/2007 | Morrison et al. | |
| 7,207,039 B2 | 4/2007 | Komarla et al. | |
| 7,284,042 B2* | 10/2007 | Beadles et al. | 709/220 |
| 7,305,550 B2* | 12/2007 | Oliver et al. | 713/156 |
| 7,310,669 B2* | 12/2007 | Webb et al. | 709/224 |
| 7,315,826 B1* | 1/2008 | Guheen et al. | 705/7 |
| 7,330,967 B1 | 2/2008 | Pujare et al. | |
| 7,340,637 B2 | 3/2008 | Nagoya | |
| 7,350,112 B2 | 3/2008 | Fox et al. | |
| 7,383,433 B2* | 6/2008 | Yeager et al. | 713/157 |
| 7,395,322 B2 | 7/2008 | Harvey et al. | |
| 7,434,253 B2* | 10/2008 | Crall et al. | 726/10 |
| 7,480,907 B1* | 1/2009 | Marolia et al. | 717/174 |
| 7,506,040 B1 | 3/2009 | Rabe et al. | |
| 7,506,151 B2 | 3/2009 | Miyamoto et al. | |
| 7,509,487 B2* | 3/2009 | Lu et al. | 713/151 |
| 7,516,218 B2 | 4/2009 | Besson | |
| 7,519,691 B2 | 4/2009 | Nichols et al. | |
| 7,574,481 B2 | 8/2009 | Moore et al. | |
| 7,596,227 B2* | 9/2009 | Illowsky et al. | 380/277 |
| 7,600,005 B2 | 10/2009 | Jamkhedkar et al. | |
| 7,600,113 B2* | 10/2009 | Kuehnel et al. | 713/155 |
| 7,606,868 B1 | 10/2009 | Le et al. | |
| 7,627,617 B2* | 12/2009 | Kavuri et al. | 1/1 |
| 7,640,325 B1 | 12/2009 | DeKoning et al. | |
| 7,653,008 B2* | 1/2010 | Patrick et al. | 370/254 |
| 7,668,947 B2* | 2/2010 | Hutchinson et al. | 709/223 |
| 7,671,735 B2* | 3/2010 | Karaoguz et al. | 340/539.14 |
| 7,673,130 B2 | 3/2010 | Miyamoto et al. | |
| 7,681,080 B2 | 3/2010 | Abali et al. | |
| 7,716,316 B2 | 5/2010 | Nichols et al. | |
| 7,734,717 B2 | 6/2010 | Saarimaki et al. | |
| 7,779,119 B2* | 8/2010 | Ginter et al. | 709/224 |
| 7,787,863 B2* | 8/2010 | van de Groenendaal | 455/411 |
| 7,792,986 B2* | 9/2010 | Donoho et al. | 709/236 |
| 7,827,261 B1 | 11/2010 | Griswold et al. | |
| 7,827,590 B2* | 11/2010 | Hopen et al. | 726/1 |
| 7,831,692 B2 | 11/2010 | French et al. | |
| 7,831,997 B2 | 11/2010 | Eldar et al. | |
| 7,937,437 B2 | 5/2011 | Fuji | |
| 8,051,181 B2* | 11/2011 | Larson et al. | 709/227 |
| 8,073,908 B2* | 12/2011 | Heins et al. | 709/204 |
| 8,103,776 B2 | 1/2012 | DeHaan | |
| 8,103,783 B2* | 1/2012 | Plamondon | 709/229 |
| 8,117,314 B2* | 2/2012 | Croft et al. | 709/227 |
| 8,131,825 B2* | 3/2012 | Nord et al. | 709/219 |
| 8,131,851 B2* | 3/2012 | Harlow | 709/224 |
| 8,132,166 B2 | 3/2012 | DeHaan | |
| 8,185,891 B2 | 5/2012 | DeHaan | |
| 8,205,240 B2* | 6/2012 | Ansari et al. | 726/1 |
| 8,244,836 B2 | 8/2012 | DeHaan | |
| 8,271,975 B2 | 9/2012 | DeHaan | |
| 8,336,089 B1* | 12/2012 | Ahmed et al. | 726/7 |
| 8,346,929 B1* | 1/2013 | Lai | 709/226 |
| 8,355,407 B2* | 1/2013 | Wookey et al. | 370/401 |
| 8,370,528 B2* | 2/2013 | Bryers et al. | 709/249 |
| 8,407,687 B2* | 3/2013 | Moshir et al. | 717/171 |
| 8,429,630 B2* | 4/2013 | Nickolov et al. | 717/148 |
| 8,498,941 B2* | 7/2013 | Felsher | 705/51 |
| 8,504,696 B2* | 8/2013 | Larson et al. | 709/227 |
| 2002/0062259 A1 | 5/2002 | Katz et al. | |
| 2002/0078186 A1 | 6/2002 | Engel et al. | |
| 2002/0099787 A1 | 7/2002 | Bonner et al. | |
| 2002/0138567 A1 | 9/2002 | Ogawa | |
| 2002/0162028 A1 | 10/2002 | Kennedy | |
| 2003/0005097 A1 | 1/2003 | Barnard et al. | |
| 2003/0055919 A1 | 3/2003 | Fong et al. | |
| 2003/0069884 A1 | 4/2003 | Nair et al. | |
| 2003/0069946 A1 | 4/2003 | Nair et al. | |
| 2003/0070110 A1 | 4/2003 | Aija et al. | |
| 2003/0074549 A1 | 4/2003 | Paul et al. | |
| 2003/0110173 A1 | 6/2003 | Marsland | |
| 2003/0119480 A1 | 6/2003 | Mohammad | |
| 2003/0126585 A1 | 7/2003 | Parry | |
| 2003/0145083 A1* | 7/2003 | Cush et al. | 709/224 |
| 2003/0195921 A1 | 10/2003 | Becker et al. | |
| 2003/0212992 A1 | 11/2003 | Ronning et al. | |
| 2003/0233648 A1 | 12/2003 | Earl et al. | |
| 2004/0006616 A1 | 1/2004 | Quinn et al. | |
| 2004/0015831 A1 | 1/2004 | Bowhill | |
| 2004/0015957 A1 | 1/2004 | Zara et al. | |
| 2004/0019876 A1 | 1/2004 | Dravida et al. | |
| 2004/0024984 A1 | 2/2004 | Lanzatella et al. | |
| 2004/0044643 A1 | 3/2004 | deVries et al. | |
| 2004/0054789 A1 | 3/2004 | Breh et al. | |
| 2004/0059703 A1 | 3/2004 | Chappell et al. | |
| 2004/0064501 A1 | 4/2004 | Jan et al. | |
| 2004/0128375 A1 | 7/2004 | Rockwell | |
| 2004/0143664 A1 | 7/2004 | Usa et al. | |
| 2004/0167975 A1 | 8/2004 | Hwang et al. | |
| 2004/0223469 A1 | 11/2004 | Bahl et al. | |
| 2005/0028025 A1 | 2/2005 | Zalewski et al. | |
| 2005/0108369 A1* | 5/2005 | Sather et al. | 709/220 |
| 2005/0114474 A1 | 5/2005 | Anderson et al. | |
| 2005/0125525 A1 | 6/2005 | Zhou et al. | |
| 2005/0177829 A1 | 8/2005 | Vishwanath | |
| 2005/0182796 A1 | 8/2005 | Chu et al. | |
| 2005/0198629 A1 | 9/2005 | Vishwanath | |
| 2005/0223374 A1 | 10/2005 | Wishart et al. | |
| 2006/0039340 A1 | 2/2006 | Ptasinski et al. | |
| 2006/0041767 A1 | 2/2006 | Maxwell et al. | |
| 2006/0095230 A1 | 5/2006 | Grier et al. | |
| 2006/0095702 A1 | 5/2006 | Hickman et al. | |
| 2006/0155857 A1 | 7/2006 | Feenan et al. | |
| 2006/0173912 A1 | 8/2006 | Lindvall et al. | |
| 2006/0174018 A1 | 8/2006 | Zhu et al. | |
| 2006/0190575 A1 | 8/2006 | Harvey et al. | |
| 2006/0190773 A1 | 8/2006 | Rao et al. | |
| 2006/0200658 A1 | 9/2006 | Penkethman | |
| 2006/0215575 A1 | 9/2006 | Horton et al. | |
| 2006/0218544 A1 | 9/2006 | Chakraborty et al. | |
| 2006/0230165 A1 | 10/2006 | Zimmer et al. | |
| 2006/0282479 A1 | 12/2006 | Johnson et al. | |
| 2007/0015538 A1 | 1/2007 | Wang | |
| 2007/0067419 A1 | 3/2007 | Bennett | |
| 2007/0078988 A1* | 4/2007 | Miloushev et al. | 709/227 |
| 2007/0101118 A1 | 5/2007 | Raghunath et al. | |
| 2007/0168721 A1 | 7/2007 | Luiro et al. | |
| 2007/0169093 A1 | 7/2007 | Logan et al. | |
| 2007/0192158 A1 | 8/2007 | Kim | |
| 2007/0204338 A1 | 8/2007 | Aiello et al. | |
| 2007/0226810 A1 | 9/2007 | Hotti | |
| 2007/0239858 A1* | 10/2007 | Banerji et al. | 709/220 |
| 2007/0244996 A1 | 10/2007 | Ahmed et al. | |
| 2007/0276905 A1 | 11/2007 | Durand et al. | |
| 2007/0288612 A1 | 12/2007 | Hall | |
| 2007/0294369 A1* | 12/2007 | Ginter et al. | 709/217 |
| 2007/0294376 A1 | 12/2007 | Ayachitula et al. | |
| 2007/0299951 A1 | 12/2007 | Krithivas | |
| 2008/0002588 A1 | 1/2008 | McCaughan et al. | |
| 2008/0016515 A1* | 1/2008 | Naim et al. | 719/313 |
| 2008/0028048 A1 | 1/2008 | Shekar CS et al. | |
| 2008/0040452 A1 | 2/2008 | Rao et al. | |
| 2008/0046708 A1 | 2/2008 | Fitzgerald et al. | |
| 2008/0059959 A1 | 3/2008 | Chen et al. | |
| 2008/0130639 A1 | 6/2008 | Costa-Requena et al. | |

(56) References Cited

U.S. PATENT DOCUMENTS

| | | |
|---|---|---|
| 2008/0170510 A1 | 7/2008 | Singh |
| 2008/0189693 A1 | 8/2008 | Pathak |
| 2008/0196043 A1 | 8/2008 | Feinleib et al. |
| 2008/0209033 A1* | 8/2008 | Ginter et al. ................ 709/224 |
| 2008/0215668 A1 | 9/2008 | Hu |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0288938 A1 | 11/2008 | DeHaan |
| 2008/0288939 A1 | 11/2008 | DeHaan |
| 2008/0294777 A1 | 11/2008 | Karve et al. |
| 2008/0301666 A1 | 12/2008 | Gordon et al. |
| 2008/0301780 A1 | 12/2008 | Ellison et al. |
| 2008/0313716 A1 | 12/2008 | Park |
| 2008/0320110 A1 | 12/2008 | Pathak |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0235349 A1* | 9/2009 | Lai et al. .................... 726/14 |
| 2009/0240835 A1 | 9/2009 | Adelman et al. |
| 2009/0249336 A1* | 10/2009 | Vasilevsky et al. ............ 718/1 |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2009/0300180 A1 | 12/2009 | DeHaan et al. |
| 2010/0023740 A1 | 1/2010 | Moon et al. |
| 2010/0049838 A1 | 2/2010 | DeHaan |
| 2010/0050169 A1 | 2/2010 | DeHaan |
| 2010/0054156 A1 | 3/2010 | DeHaan |
| 2010/0057833 A1 | 3/2010 | DeHaan |
| 2010/0057890 A1 | 3/2010 | DeHaan |
| 2010/0057913 A1 | 3/2010 | DeHaan |
| 2010/0057930 A1 | 3/2010 | DeHaan |
| 2010/0058307 A1 | 3/2010 | DeHaan |
| 2010/0058327 A1 | 3/2010 | DeHaan |
| 2010/0058328 A1 | 3/2010 | DeHaan |
| 2010/0058330 A1 | 3/2010 | DeHaan |
| 2010/0058332 A1 | 3/2010 | DeHaan |
| 2010/0058444 A1 | 3/2010 | DeHaan |
| 2010/0083245 A1 | 4/2010 | DeHaan |
| 2010/0100876 A1 | 4/2010 | Glover et al. |
| 2010/0128639 A1 | 5/2010 | DeHaan |
| 2010/0131632 A1 | 5/2010 | DeHaan et al. |
| 2010/0131648 A1 | 5/2010 | DeHaan |
| 2010/0138521 A1 | 6/2010 | DeHaan |
| 2010/0138526 A1 | 6/2010 | DeHaan |
| 2010/0138696 A1 | 6/2010 | DeHaan |
| 2010/0217837 A1 | 8/2010 | Ansari et al. |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0220584 A1 | 9/2010 | DeHaan et al. |
| 2010/0223367 A1 | 9/2010 | DeHaan |
| 2010/0223504 A1 | 9/2010 | DeHaan et al. |
| 2010/0223607 A1 | 9/2010 | DeHaan |
| 2010/0223608 A1 | 9/2010 | DeHaan et al. |
| 2010/0223609 A1 | 9/2010 | DeHaan et al. |
| 2010/0223610 A1 | 9/2010 | DeHaan et al. |
| 2010/0235433 A1* | 9/2010 | Ansari et al. ................ 709/203 |
| 2010/0250907 A1 | 9/2010 | DeHaan |
| 2010/0306337 A1 | 12/2010 | DeHaan |
| 2010/0306380 A1 | 12/2010 | DeHaan |
| 2010/0333084 A1 | 12/2010 | DeHaan |
| 2011/0061045 A1* | 3/2011 | Phillips .................... 717/173 |
| 2011/0131304 A1 | 6/2011 | Henson |
| 2011/0131384 A1 | 6/2011 | Henson |
| 2012/0151470 A1 | 6/2012 | DeHaan |
| 2012/0185559 A1* | 7/2012 | Wesley et al. ................ 709/217 |

OTHER PUBLICATIONS

USPTO Office Action for U.S. Appl. No. 12/395,536, mailed Apr. 25, 2012.

Agarwalla et al. "Automating Provisioning of Complete Software Stack in a Grid Environment," 2004.

Novak, Judit, "Automatic Installation and Configuration for Large Scale Farms", 2005.

Quintero et al., "Introduction to pSeries Provisioning", 2004.

HP Storage Essentials SRM 6.0 Installation Guide. Jan. 2008. HP. 1st ed. Part No. T4283-96113. pp. 1-5, 97-136, 219-228.

HP Storage Essentials SRM 6.0 User Guide. Jan. 2008. HP. 1st ed. Part No. T4238-96114. pp. 1-83.

DeHaan, Michael. "Unified Provisioning". 2007.

DeHaan, Michael. "Provisioning With Cobbler". 2007.

Tan et al. "A WBEM Basked Disk Array Management Provider". 2005. IEEE. 2005 International Conference on Cyberworlds.

Lovelace et al. Managing Disk Subsystems Using IBM TotalStorage Productivity Ceneter. Sep. 2005. IBM. 2nd ed. SG24-7097-01. pp. 1-42.

Grosse, "Repository Mirroring", 1995.

Anderson et al., "Technologies for Large-Scale Configuration Management", Dec. 9, 2002.

Butt et al., "Automated Installation of Large-Scale Linux Networks", 2000.

eBook "Microsoft System Management Server 2003 Administrator's Companion", Microsoft Press. C2004, Ch. 13, Patch Management, pp. 471-507.

Doc Searls "Linux for Suites", 2005, Specialized System Consultants Inc., vol. 2005.

Maghraoui et al., "Model Driven Provisioning: Bridging the Gap Between Declarative Object Models and Procedural Provisioning Tools", 2006.

USPTO Office Action mailed Oct. 7, 2010 for U.S. Appl. No. 11/763,315.

USPTO Office Action mailed Apr. 20, 2011 for U.S. Appl. No. 11/763,315.

USPTO Notice of Allowance mailed Nov. 2, 2011 for U.S. Appl. No. 11/763,315.

USPTO Office Action mailed Oct. 7, 2010 for U.S. Appl. No. 11/763,333.

USPTO Office Action mailed Apr. 20, 2011 for U.S. Appl. No. 11/763,333.

USPTO Notice of Allowance mailed Oct. 27, 2011 for U.S. Appl. No. 11/763,333.

USPTO Office Action mailed Oct. 12, 2010 for U.S. Appl. No. 12/325,056.

USPTO Office Action mailed Mar. 31, 2011 for U.S. Appl. No. 12/325,056.

USPTO Office Action mailed Mar. 6, 2012 for U.S. Appl. No. 12/325,056.

USPTO Office Action mailed Jun. 19, 2012 for U.S. Appl. No. 12/325,056.

USPTO Office Action mailed Jun. 28, 2013 for U.S. Appl. No. 12/325,056.

* cited by examiner

REMOTE MANAGEMENT OF NETWORKED SYSTEMS USING SECURE MODULAR PLATFORM

FIELD

The present teachings relate to the remote management of networked systems using a secure modular platform, and more particularly to platforms and techniques for remotely accessing, configuring and controlling networked systems using a secure modular platform including a user-extensible library of remote management commands.

BACKGROUND OF RELATED ART

In the network configuration and management realm, various protocols and command sets have been developed to set up and operate networks of machines, such as servers or other machines. The use of the Secure Shell (SSH) platform has, for example, become known for the remote configuration of individual servers and other machines deployed on public or private networks.

Remote configuration platforms such as SSH, however, were not designed and do not operate with the full range of remote system management functions in mind. SSH itself generally involves encrypted exchanges over a secure channel from one computer to another, typically to permit an administrator or user of a first machine to tunnel into a second machine. The second machine can then be remotely configured or provisioned, for example to load desired software applications onto the remote, second machine.

This type of remote one-to-one provisioning, however, does not contemplate larger network management issues, such as taking a hardware inventory of an array of machines on a network, purging obsolete files form file servers on a network, or performing any number of other higher-order systems management tasks. As a result, systems administrators using SSH or similar command protocols may be forced to custom-write various routines to attempt to automatically or sequentially perform a range of network administration tasks across entire collections of machines. The amount and complexity of the hand-written code based on SSH or similar protocols necessary to manage a large-scale network, for instance on the order of thousands of servers, can become cumbersome. Even when customized command modules can be written for an SSH-based or similar network having a large number of machines, that code must then be tested and validated for its intended purposes on the network, which may also be a time-intensive task and which may require significant debugging efforts.

It may be desirable to provide methods and systems for the remote configuration of networked systems using a secure modular platform that can provide a compact, reliable interface to invoke both pre-configured command modules and user-customized command functions on a large-scale basis with reduced development overhead.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for the remote management of networked systems using a secure modular platform. More particularly, embodiments relate to a network management system and associated management application programming interfaces (APIs) and related command modules designed to establish secure connections to one or more networked machines, and manage and control those resources remotely an a group or network-wide basis using unified commands and instructions. In embodiments in one regard, the network management system can comprise a management server hosting a management engine, along with a command directory storing APIs, modules, commands or instructions and related data to permit a systems administrator or other user to interrogate, configure, update, and manage the set of networked machines under central control using a compact instruction set. In embodiments, the set of networked machines can consist of a set of servers, a set of clients, a set of databases or database servers, or other machines or resources.

According to embodiments, a remote management daemon running in the network management system can access a directory residing on the resident management. The directory can contain a set of core modules containing pre-configured or native APIs and associated commands. The set of core modules can for instance contain APIs and commands designed to permit common network tasks to be conducted across some or all machines in the set of networked machines, using one command. APIs and commands to permit an operator to query machines for their hardware, software, storage, or input/output (110) state can for example be included in the set of core modules.

In addition to the set of core modules containing pre-configured or native APIs and commands, the command directory can also receive or contain a set of user-defined modules containing custom-coded or configured APIs and commands built by the systems administrator, or other user. The set of user-defined modules can be configured to permit a systems administrator to tailor certain API definitions, commands or instructions to the needs and architecture of a particular network, and store those APIs and commands to the management directory. User-defined APIs and commands can themselves make use of the set of core modules available through the network management system.

Both the set of core modules and set of user-defined modules associated commands can communicate with the set of networked machines via a secure channel. The network management system can host a certificate module that automatically communicates certificate information, such as Secure Socket Layer (SSL) certificates, between the network management system and the set of networked machines under central control. The built-in security of the connection to the set of networked machines can permit the systems administrator or other user to safely and reliably log into remote machines, inventory those machines, update software or other resources of those machines on a secure basis, without a need to add separate security coding.

According to embodiments in one regard, due in part to the fact that the set of core modules and/or the set of user-defined modules are inherently network-aware, and can be built with the capability to communicate with multiple machines using single commands and/or APIs, the code base required to effectively manage even large networks can be made compact and robust. Coding effort, complexity and debugging can therefore all be reduced. These and other embodiments described herein address the various noted shortcomings in known network configuration technology, and provide a user or network operator with enhanced efficiency and dependability in network operations.

Reference will now be made in detail to exemplary embodiments of the present teachings, which are illustrated in the accompanying drawings. Where possible the same reference numbers will be used throughout the drawings to refer to the same or like parts.

Figure 1:
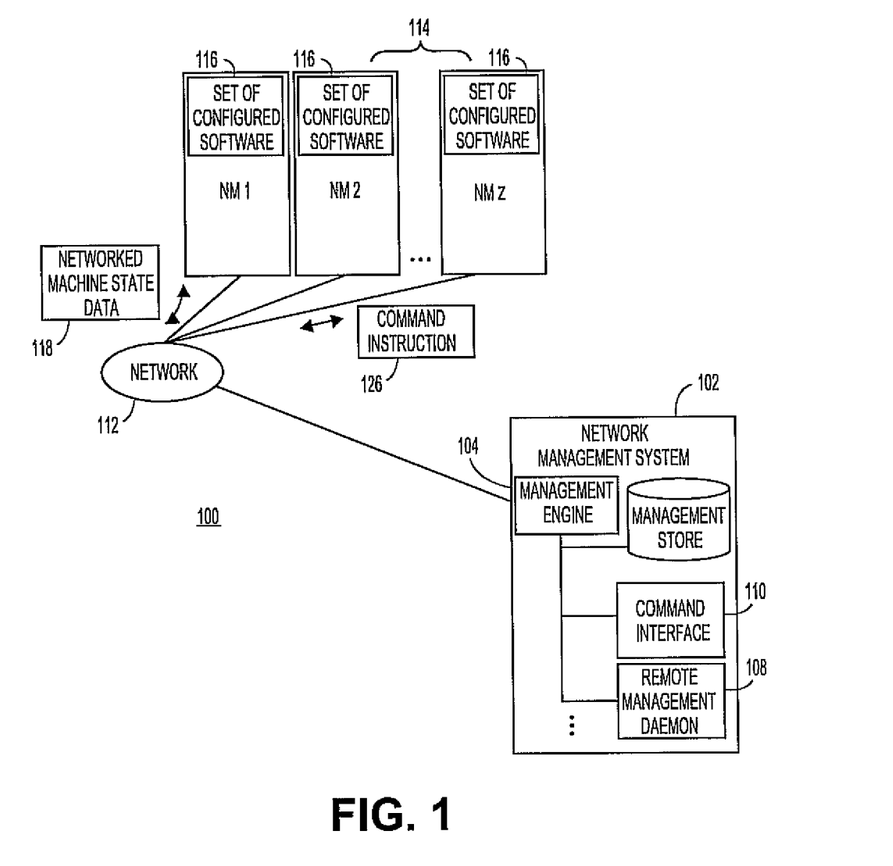
FIG. 1 illustrates an overall system for the remote management of networked systems using a secure modular platform, according to various embodiments of the present teachings.

FIG. 1 illustrates a high-level diagram of an overall network system 100, consistent with various aspects of the present teachings. System 100 can include a set of networked machines 114 connected to each other and other resources via one or more networks 112. Individual machines in set of networked machines 114 can be or include, for example, servers, clients, databases or database servers, or other hardware or machine resources. In embodiments, set of networked machines 114 can contain machines of the same or similar type, or can contain diverse types or numbers of machines. In embodiments, set of networked machines 114 can range from a comparatively small-scale to a large-scale deployment, for instance including hundreds, thousands, or other numbers of machines.

Each machine in set of networked machines 114 can also host and execute a set of configured software 116, including for instance an operating system, applications or other programs, utilities or other software. In embodiments, the set of configured software 116 for the machines in set of networked machines 114 can be the same or similar, or can be diverse in terms of the type, number, or versions of software installed. One or more networks 112 can include the Internet, or other public or private networks or connections.

The set of networked machines 114 can further communicate with a network management system 102 via one or more network 112. Network management system 102 can monitor set of networked machines 114 to identify the operating state of the machines and their software components. Network management system 102 can received networked machine state data 118 indicating the state of one or more machines in set of networked machines 114 to perform those network administrative tasks. Networked machine state data 118 can contain, for example, data describing the execution state of any one or more machine including processor faults or hangs, the state of memory operations such as buffer overflows or leaks, the power consumption of machines, the detection of viruses or other malicious software, the hardware components of any one or more machines, or other data capturing the configuration or execution state of any one or more machine.

Network management system 102 can communicate with and control set of networked machines 114 via a management engine 104. Management engine 104 can in turn communicate with a management store 106 such as a database stored on a local hard drive, as well as a remote management daemon 108 and a command interface 110. Command interface 110 can comprise a graphical, command-line, or other interface permitting a systems administrator or other user to access remote management daemon 108 and related resources, and manage set of networked machines 114 by issuing one or more command instruction 126, or other communications.

According to embodiments, remote management daemon 108 can comprise logic and other resources to communicate with and manage set of networked machines 114. Remote management daemon 108 can access a management directory containing both a set of core modules hosting a set of core pre-configured APIs and commands, as well as a set of user-defined modules hosting customized user-defined APIs and commands. The remote management daemon 108 can, in general, interact with APIs defining a set of calls or functions including parameters to pass data between command interface 110 and network management system 102 and/or set of networked machines 114.

Using remote management daemon 108, applications running in command interface 110 can invoke or request data or functions from other resources of network management system 102, to monitor the configuration and state of set of networked machines 114. The remote management daemon 108 can support an associated set of commands, such as functions and data queries, that can for instance be entered by the user of command interface 110 to interrogate set of networked machines 114 on a network-wide basis. As used at times herein, "command" can refer to an individual command issued by a user directed to set of networked machines 114, an API definition configured to received and process an associated command or instruction, or both together. In embodiments, command interface 110 can include a Web browser-based interface including query boxes or input lines for desired commands, or can include a text-based command line interface. Other interfaces or network tools can be incorporated in command interface 110.

The pre-configured core or native modules and associated APIs and commands within remote management daemon 108 can include defined calls for commonly required network management tasks, such as interrogating all machines in set of networked machines 114 to report their hardware or software state or configuration. The pre-configured core modules can include commands, APIs, instructions, or other interfaces to permit the systems administrator or other user to communicate with one, some, or all of the set of networked machines 114, using one command on a network-wide basis. For example, a core module in or accessed by remote management daemon 108 can define a command in a general form such as "Transmit_Email_Image for All_Servers_At_Location_X" which causes network management system 102 to interrogate all email servers at a given location to transmit a list or image of pending email messages to network management system 102. Remote management daemon 108 can communicate with set of networked machines 114 via a secure connection, such as an encrypted channel.

In addition to core modules containing pre-configured APIs or commands, remote management daemon 108 can also accept and store an extensible set of user-defined modules. A systems administrator or other user can code APIs or commands tailored to their specific network needs, and insert those APIs or commands directly into set of stored modules. The user-defined modules can themselves invoke other APIs or commands, whether pre-configured or user-defined, to build further API or command structures. For instance, an illustrative user-defined module with associated APIs, commands or calls can comprise the following coding from network management system 102, and using bash and Python coding or tools:

TABLE 1

From bash:
func target.example.org call hardware info
func "*.example.org" call yum update
func "*" call moduleyouwrote functionname 1234 5678 firetruck acmelabs hike!
Everything also can be scripted from Python:
import func.overlord.client as fc
client = fc.Client("*.example.org;*.example.com")
package controls!
client.yum.update( )
service controls!
client.service.start("acme-server")
hardware info!
print client.hardware.info( )
etc ... etc ..

Other modules, APIs, commands, instructions and interfaces are possible. Due in one regard to the ability to automatically establish a secure connection to any desired machine in set of networked machines 114, as well as to use and build modules capable of accessing multiple machines including the entire network using a compact command structure, the ability to manage set of networked machines 114 can be scaled significantly with little added programming or development overhead.

Figure 2:
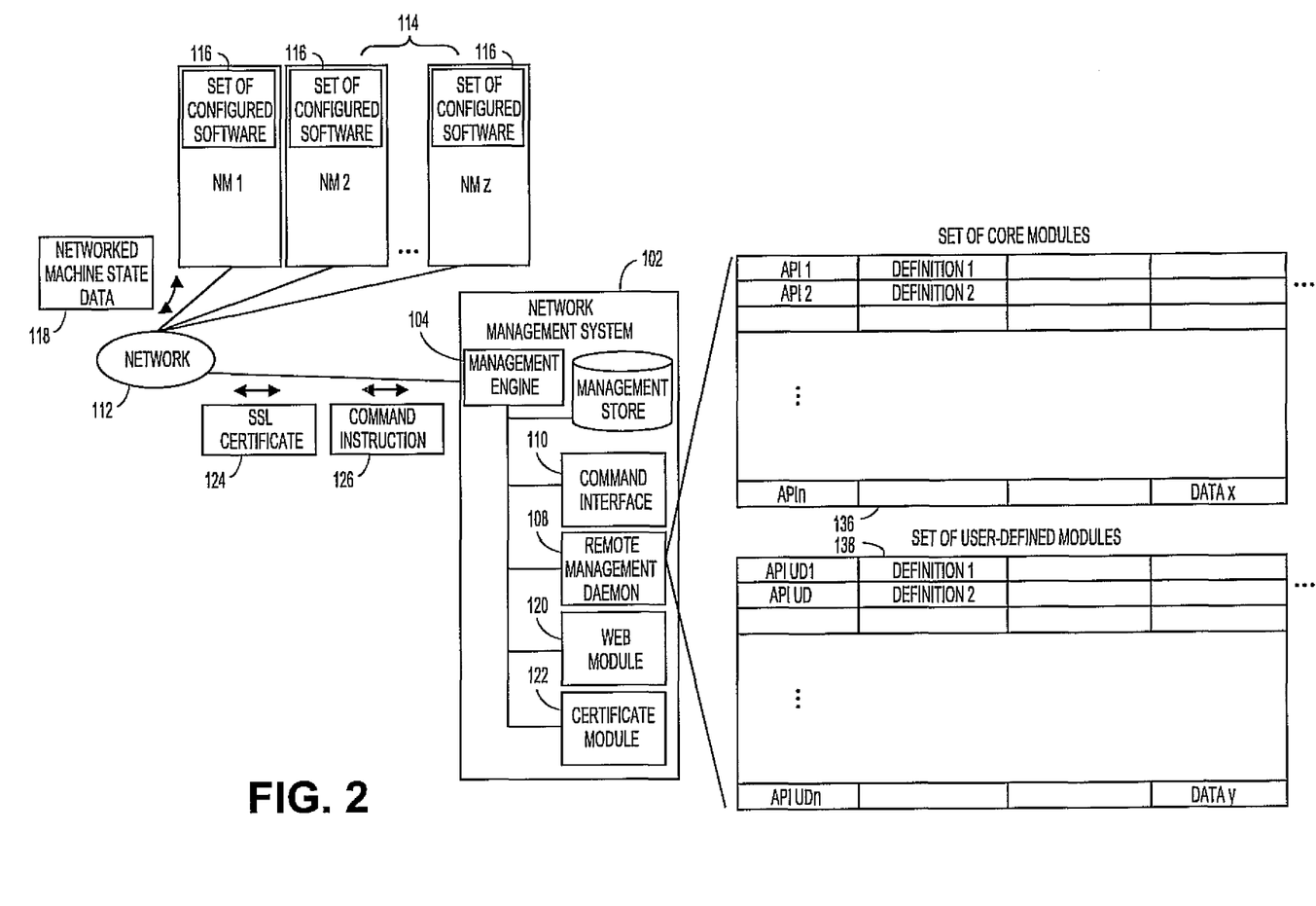
FIG. 2 illustrates an overall system for the remote management of networked systems using a secure modular platform in further regards including a command director, according to various embodiments.

FIG. 2 illustrates embodiments of remote network management system 102 according to further regards, including further details regarding various aspects of the interaction between network management system 102 and set of networked machines 114 under common control. In embodiments as shown, a network administrator or other user can operate command interface 110 of network management system 102 to access software and other resources to communicate with set of networked machines 114. In implementations as shown, those resources can include remote management daemon 108 which in turn accesses a set of core modules 136 as well as a set of user-defined modules 138, each hosting sets of API and command definitions. Command interface 110 can also communicate with other resources of network management system 102, including management engine 104, management store 106 (such as a local database), a Web module 120, and a certificate module 122. In embodiments, command interface 110 can be or include a command-line interface, graphical interface, a Web or browser interface, a specified API, a network API, or other interfaces. In embodiments, network management engine 102 can communicate with set of networked machines 114 via one or more networks 112 using secure XMLRPC (Extensible Markup Language Remote Procedure Call) connections, or other channels.

Set of core modules 136 can contain a set of pre-configured or pre-loaded APIs, commands, modules, and other resources reflecting common network management tasks or requests, such as requests to report hardware or software status, perform software updates, or other frequent administrative services. Set of user-defined modules 138 can contain APIs, commands, modules, and other resources directed to a user's specific network implementation and needs. According to embodiments, the Web module 120 of network management system 102 can provide a Web service or application to permit interaction with network management system 102, and related resources. Each of set of core modules 136 and set of user-defined modules 138 can contain APIs and commands to permit a network administrator to communicate with set of networked machines 114 on a network-wide basis, without special coding requirements.

For example, in either set of core modules 136 or user-defined modules 138, targets can be defined as arbitrary groups of machines within set of networked machines 114, or based on wildcards of hostnames. In a further regard, the APIs and commands hosted in set of core modules 136 or user-defined modules 138 can permit the transparent transmission and execution of one or more command instruction 126 to multiple hosts simultaneously in any number of separate processes, to reduce the total time to complete a task sent to multiple nodes, though to the API caller it all appears as though it was executed in a single process. It may be noted that in embodiments, besides permitting the addition to new client (remote) modules, the user can also command interface 110 itself by writing new modules to add functionality and loading those modules to set of user-defined modules 138.

Network management system 102 can also host certificate module 122 to manage the communication of one or more SSL (Secure Socket Layer) certificate 124 or other certificates to set of networked machines 114, and thereby provide integral support for authentication or certification services. In embodiments, certificate module 122 and related APIs can be accessed by third party applications interacting with network management system 102. In embodiments, SSL certificate 124 can be auto-signed, or can be manually signed by a network administrator. Certificate module 122 can, in embodiments, to take user-defined actions (e.g., such as sending an email) when new certificates are received.

In embodiments, remote management daemon 108, command interface 110, or other resources of network management system 102 can permit the automatic logging of all network management traffic, including for example networked machine data 118, one or more command instruction 126, one or more SSL certificate 124, or other information reflecting the state of the set of networked machines 114 and communication between those machines and network management system 102. Data traffic logs generated in this manner can be used for audit purposes or other uses.

In terms of further functionality and management operations supported by network management system 102, in embodiments, for instance, set of core modules 136 and/or set of user-defined modules 138 can contain an API for the asynchronous execution of log running commands and checking the status of these commands, which can report partial status back from nodes as they report in. In embodiments, set of core modules 136 and/or set of user-defined modules 138 can contain an API to remotely query and/or list the modules and methods that a remote networked machine may host. This capability in another regard can be referred to as interface "introspection," and can represents a dynamic function. For example, on any given connection the interrogation can return different answers, based on what has been installed on that client.

Further, in embodiments any module in set of core modules 136 and/or set of user-defined modules can be remotely copied to remote management systems or other resources, without having to change the source code for the underlying modules or recompile them. According to embodiments in a further regard, besides the ability to replace more limited remote systems such as SSH, network management system 102 along with set of core modules 136, set of user-defined modules 138 and other resources can be used to generate additional applications or services, such as network applications or Web services.

Figure 3:
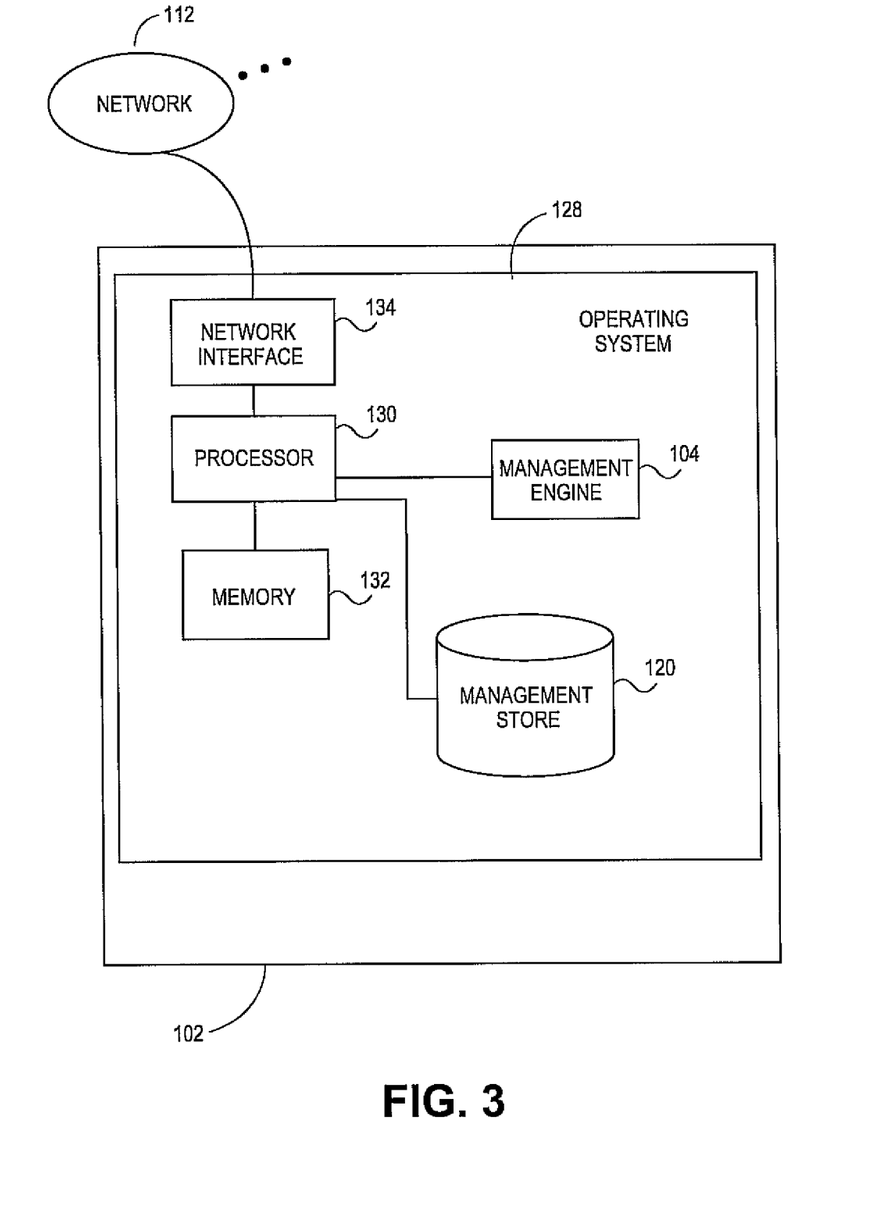
FIG. 3 illustrates an exemplary hardware diagram of a network management system and associated resources, according to various embodiments.

FIG. 3 illustrates an exemplary diagram of hardware and other resources that can be incorporated in a network management system 102 configured to communicate with set of networked machines 114 via one or more networks 112, according to embodiments. In embodiments as shown, network management system 102 can comprise a processor 130 communicating with memory 132, such as electronic random access memory, operating under control of or in conjunction with operating system 128. Operating system 128 can be, for example, a distribution of the Linux™ operating system, the Unix™ operating system, or other open-source or proprietary operating system or platform. Processor 130 also communicates with management store 106, such as a database stored on a local hard drive. Processor 130 further communicates with network interface 134, such as an Ethernet or wireless data connection, which in turn communicates with one or more networks 112, such as the Internet or other public or private networks. Processor 130 also communicates with management store 106 and management engine 104, to execute control logic and control the operation of hardware, software, operating system and other resources in set of networked machines 114. Other configurations of network management system 102, associated network connections, and other hardware and software resources are possible.

Figure 4:
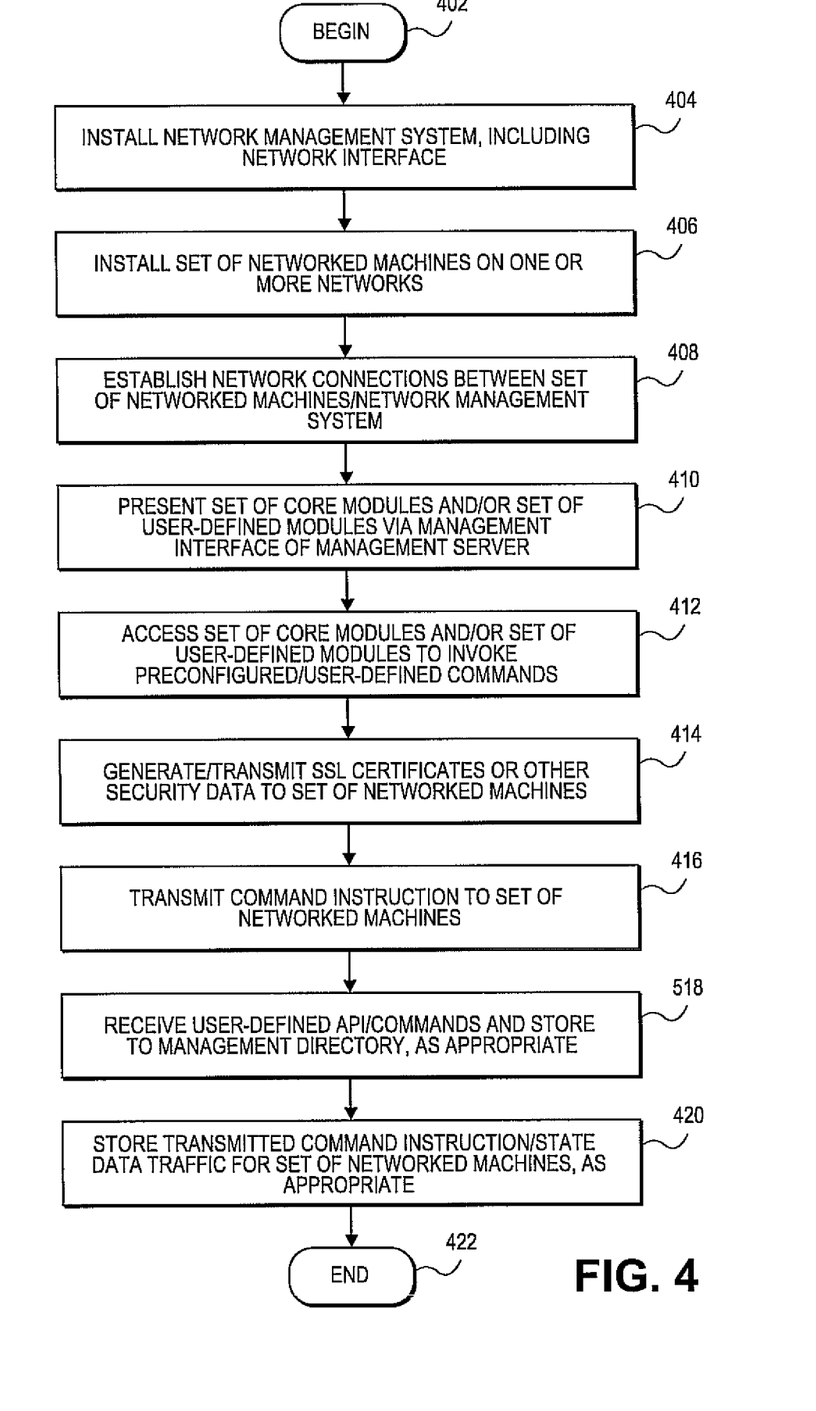
FIG. 4 illustrates a flow diagram of overall remote network management processing, according to various embodiments.

FIG. 4 illustrates a flow diagram of overall remote network management using a secure modular platform, according to various embodiments. In step 402, processing can begin. In step 404, network management system 102, for example in the form of a network server, can be installed, including for instance network interface 134 to one or more networks 112. In step 406, set of networked machines 114 can be installed on one or more networks 112. Set of networked machines 114 can comprise, for example, a set of servers, a set of clients, a set of database servers, or other resources or combinations of those resources. In step 408, network connections between network management system 102 and set of networked machines can be established via one or more networks 112, for example using TCP/IP (Transmission Control Protocol/Internet Protocol) or other protocols or channels.

In step 410, remote management daemon 108 can access and present set of core modules 136 and/or set of user-defined modules 138 to an operator, programmer, or other user via network management system 102 or other resource. Remote management daemon 108 can access and present set of core modules 136, which contain or host pre-configured APIs and commands, including APIs permitting the interrogation or other interaction with one or multiple machines in set of networked machines 114. Remote management daemon 108 can also access and present set of user-defined modules 138 which comprise one or more APIs and commands designed and coded by the user or others. In embodiments, set of core modules 136 and/or set of user-defined modules 138 can be stored in a directory or volume in management store 106 of network management system 102, or other storage locations.

In step 412, set of core modules 136 and/or set of user-defined modules 138 can be accessed via remote management daemon 108 to invoke or call pre-configured or user-defined commands, functions, modules, data, interfaces or routines. In step 414, certificate module 122 of network management system 102 can transmit or communicate one or more SSL certificate 124 or other security object or data to or from set of networked machines 114 via one or more networks 112. In step 416, network management system 102 can transmit one or more command instruction 126 to set of networked machines 114 via the API, command or other resource accessed via remote management daemon 108. Network management system 102 can transmit, for example, a command instruction 126 to set of networked machines 114 requesting each machine to perform a self-inspection and report a software or hardware configuration back to network management system 102, to determine, for example, what operating system or systems are installed on the machines or whether any machines contain a defective memory, battery, or other part. In step 418, remote management daemon 108 and/or management engine 104 can receive a new or updated user-defined module containing a new or modified API or command definition for inclusion in set of user-defined modules 138, as appropriate. In step 420, any transmitted command instruction 126 as well as networked machine state data 118 or other traffic or information related to the configuration and state of set of networked machines 114 can be stored, for instance to management store 106 or other storage. In step 422, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a network management engine communicates with a single set of networked machines, in embodiments the network management engine can communicate with and control multiple sets of networked machines, which sets can represent clients, servers, or other machines configured in diverse ways. For further example, while embodiments have been described in which a network management engine can communicate with a set of networked machines via a single or unitary network, in embodiments the network management engine and/or set of networked machines can be connected via multiple networks or connections. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
providing a network interface to a set of networked machines;
accessing, by a processor, a single network-management command from a library of command modules, the library of command modules comprising:
a set of core network-management modules, and
a set of user-defined network-management modules;
transmitting, by the processor, via a secure channel, the single network-management command to the set of networked machines via a command interface using the network interface, wherein the single network-management command controls multiple machines in the set of networked machines to perform a same operation; and
communicating certificates to the set of networked machines to establish a secure channel to the set of networked machines.

2. The method of claim 1, wherein the set of networked machines comprises a set of networked servers or a set of networked clients.

3. The method of claim 1, wherein the command interface comprises a set of application programming interfaces (APIs).

4. The method of claim 1, where the single network-management command comprises a software provisioning command, a hardware inventory command, a messaging command, or a security command.

5. The method of claim 1, wherein the certificates comprise secure socket layer (SSL) certificates.

6. The method of claim 1, wherein the network interface comprises an Internet connection.

7. The method of claim 1, further comprising logging data traffic between the command interface and the set of networked machines.

8. A system comprising:
a network interface to a set of networked machines; and
a network management engine, to communicate with the network interface via a secure channel, the network management engine transmitting, by a processor, a single network-management command to the set of networked machines via a command interface, wherein the single network-management command controls multiple machines to perform a same operation, and wherein the command interface comprises:
- a certificate module to communicate certificates to the set of networked machines to establish a secure channel to the set of networked machines, and
- a library of command modules comprising the single network-management command, the library of command modules further comprising:
  - a set of core network-management modules, and
  - a set of user-defined network-management modules.

9. The system of claim 8, wherein the set of networked machines comprises a set of networked servers or a set of networked clients.

10. The system of claim 8, wherein the command interface comprises a set of application programming interfaces (APIs).

11. The system of claim 8, wherein the single command comprises a software provisioning command, a hardware inventory command, a messaging command, or a security command.

12. The system of claim 8, wherein the certificates comprise secure socket layer (SSL) certificates.

13. The system of claim 8, wherein the network interface comprises an Internet connection.

14. The system of claim 8, wherein the command interface is further to log data traffic between the command interface and the set of networked machines.

15. A non-transitory computer-readable storage medium with executable instructions stored thereon, wherein the instructions, when executed by a processor, perform operations comprising:

Accessing, by a processor, a single network-management command from a library of command modules, the library of command modules comprising:
- a set of core network-management modules, and
- a set of user-defined network-management modules;

transmitting, by the processor, via a secure channel, the single network-management command to a set of networked machines via a network interface, wherein the single network-management command is capable of controlling multiple machines in the set of networked machines to perform a same operation; and transmitting certificates to the set of networked machines to establish a secure channel to the set of networked machines.

16. The non-transitory computer-readable storage medium of claim 15, wherein the networked machines comprises a networked server or a networked client.

17. The non-transitory computer-readable storage medium of claim 15, wherein the transmitting is performed via a command interface comprising a set of application programming interfaces (APIis).

18. The non-transitory computer-readable storage medium of claim 15, wherein the single network-management command comprises a software provisioning command, a hardware inventory command, a messaging command, or a security command.

19. The non-transitory computer-readable storage medium of claim 15, wherein the certificates comprise secure socket layer (SSL) certificates.

20. The non-transitory computer-readable storage medium of claim 15, wherein the transmitting is performed via an Internet connection.

21. The non-transitory computer-readable storage medium of claim 15, wherein the operations further comprise logging data traffic to and from the set of networked machines.

* * * * *